Aug. 28, 1956
G. FERRAROTTI ET AL
2,760,603
SHOCK ABSORBER WITH RUBBER VALVE
Filed Jan. 19, 1951
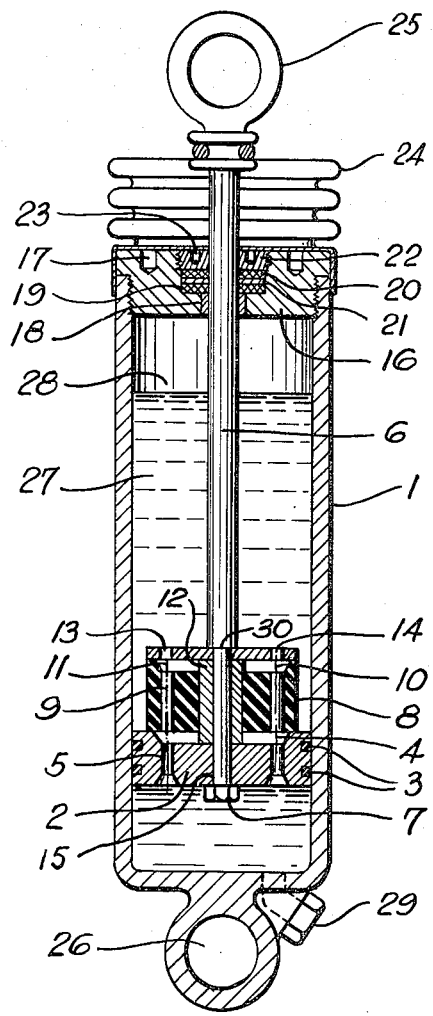
INVENTORS
G. Ferrarotti and F. Guasso
BY
ATTORNEYS

United States Patent Office 2,760,603
Patented Aug. 28, 1956

2,760,603

SHOCK ABSORBER WITH RUBBER VALVE

Giuseppe Ferrarotti and Francesco Guasso, Turin, Italy

Application January 19, 1951, Serial No. 206,814

3 Claims. (Cl. 188—88)

This invention relates to shock absorbers for motor cars and the like.

It is an object of the instant invention to provide a shock absorber of greater simplicity and more silent operation than heretofore known.

A further object is to decrease costs in the manufacture of shock absorbers.

Other objects of the instant invention will become apparent in the course of the following specification.

In the attainment of the aforesaid objectives, subject shock absorber is constituted of a single cylinder closed at both ends. Reciprocable in the cylinder is a piston, the inner end of the rod of which is slidably inserted through one end of the cylinder. The piston head is secured to the inner end of the rod, the head having formed therein on the side of the outer end of the rod an annular recess and further having formed therethrough openings connecting the recess with the opposite side of the head. The rate of flow of a fluid which partially fills the cylinder through the openings when the head is displaced is adjustably regulated by a valve. The valve is constituted of a resilient cylindrical member one end of which is over the annular recess while in the opposite end is an upper chamber with a peripheral lip. Longitudinal openings are made through the resilient member between the annular recess and the upper chamber while a central opening coaxial with the rod permits the insertion of a metal bushing around the rod with one end in the recess and the free end in the plane of the peripheral lip. A disc concentric with the rod and provided with escape ports is placed over the free end of the bushing and the peripheral lip. By maintaining the disc on the rod in a manner preventing the longitudinal movement thereof away from the head and inserting a bushing with a different axial dimension the valve can be made to vary the flow of the fluid through the head to accommodate a thrust in variance with the designed load of the shock absorber.

The invention will appear more clearly from the following detailed description when taken in conjunction with the accompanying drawing showing by way of example a preferred embodiment of the inventive concept.

In the drawing:

The figure is a longitudinal sectional view of the shock absorber constructed in accordance with the principles of this invention.

Referring now in greater detail to the drawing, where like reference numerals indicate like parts, reference numeral 1 indicates the hollow cylinder, 2 the piston head, and 6 the piston rod.

The cylinder 1 is a hollow body having one closed and one open end. The open end is internally threaded for the attachment of the plug 16. Through the center of the plug 16 is a central opening for the slidable insertion of the inner end of the later described piston rod 6. The closed end of the cylinder has an integrally formed ring 26 while adjacent the ring is a filling hole formed through the closed end and the outer end of which is closed by any suitable plug 29.

Reciprocable in the hollow cylinder 1 is the piston constituted of the rod 6 and the head 2.

The rod 6 is of circular cross section with the inner end slidably inserted through the previously mentioned central opening of the plug 16 and constricted as at 15 to form a shoulder 30, the free end extremity of the constricted portion being externally threaded.

The piston head 2 is provided with the sealing rings 3 and a central circular opening through which the threaded end extremity of the constricted end of the rod is inserted. A nut 7 threaded on the constricted end of the rod protruding through the head secures the head in conjunction with the shoulder 30 and the later described bushing 12 and disc 13 to the rod. The head has further formed on the side of the outer end of the rod an annular recess 4. Openings 5 connect the recess with the opposite side of the head.

Coaxial with the constricted portion 15 of the rod 6 is a cylindrical rubber block or member 8 one end of which is placed over the recess 4. In the opposite end of the block is an upper chamber 10 having the peripheral upwardly directed lip 11. Connecting the recess 4 and the upper chamber 10 are the longitudinal openings 9. Maintaining the block or member 8 coaxial with the constricted portion 15 of the rod is a metal bushing 12 axially inserted therethrough and one end of which is in the aforementioned annular recess 4 with the opposite end in the plane of the peripheral lip 11. Between the lip and the free end of the bushing on one side and the shoulder 30 on the opposite side is a disc 13 through which the escape ports 14 leading into the upper chamber 10 are provided.

The outer end of the piston rod 6, slidably inserted through the plug 16, is provided with a seal where it passes through the plug. The seal is constituted of the rubber sealing rings 19 and 20 separated by a metal washer 21. The components of the seal are held in place on one side by a sleeve 18 and on the opposite side by a cover plate 22 threaded into the plug as illustrated. The cover plate 22 is provided with the holes 23 and the plug 16 with the holes 17 for use with a pin spanner (not shown) when removing and inserting the cover plate and plug. Over the outer end of the plug 16 a rubber dust cover 24 is attached and through which the piston rod is slidably inserted while on the outer end extremity of the piston rod is the integrally formed ring 25.

In operation:

The cylinder 1 is partially filled with a damping fluid 27 up to the level 28 below the top with the remaining space filled with air. The ring 25 is anchored to a frame member of a motor car and the ring 26 to the axle or to a suspension device. When the cylinder is subjected to a thrust of predetermined magnitude in the direction of anchor 25, assuming, of course, that the piston head is not completely in the down position, the damping fluid below the piston head 2 in the illustration will flow through the openings 5 into the annular recess 4, thence through the longitudinal openings 9 into the upper chamber 10, and finally through the escape vents 13 into the upper part of the cylinder. If the thrust should exceed the predetermined magnitude, the pressure in the upper chamber 10 will become sufficiently high to cause the peripheral lip 11 to bulge outwardly so that the fluid will also escape around the periphery of the disc 13. The damping effect of the shock absorber can be adjusted by merely inserting a bushing with a different axial dimension thereby changing the axial pressure of the disc on the block. Obviously, if the direction of the thrust be reversed and also exceeds the predetermined magnitude, the fluid will seep also between the peripheral lip 11 and the disc 13.

While there is above disclosed but one embodiment of the improved shock absorber, it is possible to produce still other embodiments without departing from the inventive concept herein disclosed, and it is desired therefore that only such limitations be imposed on the appended claims as are stated therein, or required by the prior art.

What we claim is:

1. A shock absorber, comprising a hollow cylinder closed at both ends, a piston-rod having an inner end slidably disposed through one end of the cylinder, the inner end extremity of the rod being constricted and forming a shoulder thereon, a piston head for the rod, means securing the head to the constricted inner end extremity of the rod, the head having an annular recess formed therein on the side of the rod and having formed therethrough at least one opening connecting the recess with the opposite side of the head, the cylinder being adapted to be partially filled with a fluid, valve means co-acting with the annular recess for regulating the flow of the fluid through the opening when the head is displaced, the valve means providing a substantially uninterrupted flow of the liquid intermediate opposite sides of the head when a thrust exceeds a predetermined magnitude, the valve means comprising a cylindrical resilient member disposed over the annular recess and concentric with the constricted end of the rod, the resilient member having formed in the end opposite the recess an upper chamber with a peripheral lip and further having formed therethrough at least one opening communicating with the recess and the upper chamber and a central opening coaxial with the constricted end of the rod, a bushing for the constricted end of the rod, said bushing having a free end and being disposed through the central opening, one end of the bushing being in the upper chamber and in the plane of the peripheral lip, and a disc disposed on the rod in abutted relationship on one side with the shoulder and on the opposite side with the peripheral lip and the free end of the bushing, the disc having at least one escape port formed therethrough.

2. A tubular hydraulic shock absorber suitable for motor cars and the like, comprising a cylinder which is not completely filled with a damping liquid, a piston having flow ports formed therein to permit the passage of liquid on displacement of the piston within the cylinder, a piston-rod connected with said piston, an automatically operating valve which normally closes the fluid ports, said valve comprising a valve disc, and a cylindrical block of resilient material, and a bush mounted on the piston-rod between the piston and the valve disc and carrying said cylindrical block.

3. A shock absorber as claimed in claim 2 wherein said resilient block has formed therein a set of longitudinal holes and an inner annular recess into which said holes lead.

References Cited in the file of this patent
UNITED STATES PATENTS

| | | |
|---|---|---|
| 1,689,841 | Powell | Oct. 30, 1928 |
| 2,045,027 | Sanford | June 23, 1936 |
| 2,410,176 | Magrum | Oct. 29, 1946 |

FOREIGN PATENTS

| | | |
|---|---|---|
| 647,296 | Great Britain | Dec. 13, 1950 |